United States Patent
Lechtenböhmer et al.

(10) Patent No.: US 6,598,637 B2
(45) Date of Patent: Jul. 29, 2003

(54) PNEUMATIC TIRE HAVING A RUBBER COMPONENT CONTAINING A BLOCK STYRENE BUTADIENE COPOLYMER

(75) Inventors: Annette Lechtenböhmer, Ettelbruck (LU); Maurice Peter Catharina Jozef Klinkenberg, Gosseldange (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 14 days.

(21) Appl. No.: 09/902,117

(22) Filed: Jul. 10, 2001

(65) Prior Publication Data

US 2002/0037962 A1 Mar. 28, 2002

Related U.S. Application Data

(60) Provisional application No. 60/222,427, filed on Aug. 1, 2000.

(51) Int. Cl.[7] .................................................. B60C 5/00
(52) U.S. Cl. .................. 152/450; 152/525; 152/541; 525/88; 525/92 G; 525/93; 525/94; 525/95; 525/98; 525/99
(58) Field of Search ................................. 525/98, 99, 88, 525/92 G, 93, 94, 95; 152/450, 525, 541

(56) References Cited

U.S. PATENT DOCUMENTS

| | | | |
|---|---|---|---|
| 5,036,138 A | * | 7/1991 | Stamhuis et al. |
| 5,880,166 A | | 3/1999 | Glück et al. ................. 521/59 |
| 6,031,053 A | | 2/2000 | Knoll et al. ................. 525/314 |

* cited by examiner

*Primary Examiner*—Jeffrey C. Mullis
(74) *Attorney, Agent, or Firm*—Bruce J. Hendricks; John D. DeLong

(57) ABSTRACT

There is disclosed a pneumatic tire having a rubber component comprising a sulfur cured rubber composition composed of, based on 100 parts by weight of rubber (phr):

(a) 99 to 50 parts by weight of a first rubber containing olefinic unsaturation; and
(b) 1 to 50 parts by weight of a second rubber which is different from said first rubber and which is an elastomeric block copolymer of
 (1) from 15 to 65 percent by weight, based on the total block copolymer, of butadiene, and
 (2) from 35 to 85 percent by weight, based on the total block copolymer, of styrene, which block copolymer has:
  (a) at least two blocks A which have polymerized units of styrene, a glass transition temperature Tg above 25° C. and forms a rigid phase, and
  (b) at least one elastomeric block which is composed of about 25 to 70 percent by weight of butadiene and 75 to 30 percent by weight of styrene, and which has polymerized B/A units of styrene and butadiene in a random structure; a glass transition temperature Tg from −50° C. to 25° C., and is located between two blocks A and forms a flexible phase, and the amount of the rigid phase accounts for 5 to 40 percent by volume.

20 Claims, No Drawings

PNEUMATIC TIRE HAVING A RUBBER COMPONENT CONTAINING A BLOCK STYRENE BUTADIENE COPOLYMER

The Applicants hereby incorporate by reference prior U.S. Provisional Application Serial No. 60/222,427, filed on Aug. 1, 2000.

BACKGROUND OF THE INVENTION

U.S. Pat. No. 6,031,053 discloses a thermoplastic elastomer that is a block styrene butadiene copolymer. The block copolymer has at least one block A having polymerized units of a styrene and forming a rigid phase and at least one elastomeric block B/A having polymerized units of both styrene and butadiene and forming a flexible phase. In U.S. Pat. No. 5,880,156, these thermoplastic elastomers are disclosed as being dispersed as particles in a continuous phase of polystyrene or a styrene copolymer containing up to 50 percent of comonomers to form an expandable styrene polymer for elastic polystyrene forms. These expandable styrene polymers are prepared by polymerization of styrene in the presence of the block copolymers and impregnation with a blowing agent.

SUMMARY OF THE INVENTION

The present invention relates to a pneumatic tire having a rubber component containing a block styrene butadiene copolymer.

DETAILED DESCRIPTION OF THE INVENTION

There is disclosed a pneumatic tire having a rubber component comprising a sulfur cured rubber composition composed of, based on 100 parts by weight of rubber (phr):
(a) 99 to 50 parts by weight of a first rubber containing olefinic unsaturation; and
(b) 1 to 50 parts by weight of a second rubber which is different from said first rubber and which is an elastomeric block copolymer of
   (1) from 15 to 65 percent by weight, based on the total block copolymer, of butadiene, and
   (2) from 35 to 85 percent by weight, based on the total block copolymer, of styrene, which block copolymer has:
      (a) at least two blocks A which have polymerized units of styrene, a glass transition temperature Tg above 25° C. and forms a rigid phase, and
      (b) at least one elastomeric block which is composed of about 25 to 70 percent by weight of butadiene and 75 to 30 percent by weight of styrene, and which has polymerized B/A units of styrene and butadiene in a random structure; a glass transition temperature Tg from −50° C. to 25° C., and is located between two blocks A and forms a flexible phase, and the amount of the rigid phase accounts for 5 to 40 percent by volume.

The present invention relates to a pneumatic tire containing an elastomeric block copolymer comprising at least one block A which has polymerized units of a styrene and forms a rigid phase and at least one elastomeric block B/A which has polymerized units of styrene and of butadiene and forms a flexible phase, the glass transition temperature Tg of the block A being above 25° C. and the phase volume ratio of black A to block B/A being chosen so that the amount of the rigid phase in the total block copolymer is from 5 to 40 percent by volume and the amount of the diene in the total block copolymer is less than 50 percent by weight. These elastomeric block copolymers and their preparation are disclosed in U.S. Pat. No. 6,031,053 which is incorporated herein in its entirety.

The block copolymer may be of, for example, one of the general formula 1 to 11:

| | |
|---|---|
| (A − B/A)n; | (1) |
| (A − B/A)n − A; | (2) |
| B/A(A − B/A)n; | (3) |
| X − [(A − B/A)n]m + 1; | (4) |
| X − [(B/A − A)n]m + 1; | (5) |
| X − [(A − B/A)n − A]m + 1; | (6) |
| X − [(B/A − A)n − B/A]m + 1; | (7) |
| Y − [(A − B/A)n]m + 1 | (8) |
| Y − [(B/A − A)n]m + 1 | (9) |
| Y − [(A − B/A)n − A]m + 1 | (10) |
| Y − [(B/A − A)n − B/A]m + 1 | (11) | where A is the styrene block and B/A is the flexible phase, i.e. the block composed of random butadiene and styrene units, X is a radical of an n-functional initiator, Y is the radical of a m-functional coupling agent and m and n are natural numbers from 1 to 10.

A preferred block copolymer is one of the general formula A-B/A—A, X-[-B/A—A]2 or Y-[-B/A—A]2 (the meanings of the abbreviations are as above) and a particularly preferred block copolymer is one whose flexible phase is divided into blocks

| | |
|---|---|
| $(B/A)_1 − (B/A)_2$ | (12) |
| $(B/A)_1 − (B/A)_2 − (B/A)_1$ | (13) |
| $(B/A)_1 − (B/A)_2 − (B/A)_3$ | (14) | whose styrene/butadiene ratio differs in the individual blocks B/A or changes continuously within a block within the limits $(B/A)_1 \rightarrow (B/A)_2$, the glass transition temperature Tg of each sub-block being below 25° C.

A block copolymer which has a plurality of blocks B/A and/or A having different molecular weights per molecule is likewise preferred.

The B/A block is composed of about 75 to 30 percent by weight of styrene and 25 to 70 percent by weight of butadiene. A flexible block particularly preferably has a butadiene content of from 35 to 70 percent and a styrene content of from 65 to 30 percent.

In the case of the monomer combination styrene/butadiene, the amount of the diene in the total block copolymer is 15 to 65 percent by weight and that of the vinylaromatic component is correspondingly 85 to 35 percent by weight. Butadiene/styrene block copolymer having a monomer composition comprising 25 to 60 percent by weight of diene and 75 to 40 percent by weight of vinylaromatic compound are particularly preferred.

The block copolymer may be prepared by anionic polymerization in a nonpolar solvent with the addition of a polar cosolvent. The cosolvent acts as a Lewis base toward the metal cation. Preferably used solvents are aliphatic hydrocarbons, such as cyclohexane or methylcyclohexane. Polar aprotic compounds, such as ethers and tertiary amines, are preferred as Lewis bases. Examples of particularly effective ethers and tetrahydrofuran and aliphatic polyethers, such as diethylene glycol dimethyl ether. Examples of tertiary amines are tributylamine and pyridine. The polar cosolvent is added to the nonpolar solvent in a small amount, for examples 0.5 to 5 percent by volume. Tetrahydrofuran in an amount of 0.1 to 0.3 percent by volume is particularly preferred. Experience has shown that an amount of about 0.2 percent by volume is sufficient in most cases.

The copolymerization parameters and the amount of 1,2- and 1,4-bonds of the diene units are determined by the metering and structure of the Lewis base. The novel polymers contain, for example, 15 to 50 percent of 1,2-bonds and 85 to 60 percent of 1,4-bonds, based on all diene units.

The anionic polymerization is initiated by means of organometallic compounds. Compounds of the alkali metals, particularly lithium, are preferred. Examples of initiators are methyllithium, ethyllithium, propyllithium, n-butyllithium, sec-butyllithium and tert-butyllithium. The organometallic compound is added as a solution in a chemically inert hydrocarbon. The amount metered depends on the desired molecular weight of the polymer but is as a rule from 0.002 to 5 mol percent, based on the monomers.

The polymerization temperature may be from 0 to 130° C., preferably from 30 to 100° C.

The amount of volume of the flexible phase in the solid is of decisive importance for the mechanical properties. According to the invention, the amount by volume of the flexible phase composed of butadiene and styrene sequences is 60 to 95, preferably 70 to 90, particularly preferably 80 to 90 percent by volume.

It should be pointed out that there is no strict correlation between the above mentioned ratios of styrene and butadiene, the above mentioned limits of the phase volumes and the composition which arises from the novel ranges of the glass transition temperature, since the relevant numbers in each case are numerical values rounded up to the nearest tens unit. Any correlation is likely to be merely accidental.

The volume fraction of the two phases can be measured by means of high-contrast electron microscopy or solid-state NMR spectroscopy. The amount of styrene blocks can be determined by precipitation and weight following osmium degradation of the polybutadiene content. The future phase ratio of a polymer can also be calculated from the amounts of monomers used if polymerization is taken to completion every time.

In addition, it is to be pointed out (cf. J. Brandrup, E. H. Immergut *Polymer Handbook*, John Wiley, N.Y.) that the densities of styrene/butadiene copolymers can be calculated approximately from the mass fractions of the monomers; thus, the density of polybutadiene (obtained by anionic polymerization) is 0.895 g/ml and the density of polystyrene is about 1.05 g/ml (mean value), whereas the density is stated as 0.933 for a styrene/butadiene copolymer (SB rubber) containing 23.5 percent of styrene. The calculated density would b 0.960.

For the purposes of the present invention, the block copolymer is unambiguously defined by the quotient of the volume fraction as a percentage of the flexible phase formed from the B/A blocks and the fraction of butadiene units in the flexible phase, which is from 25 to 70 percent by weight for the combination styrene/butadiene.

The glass transition temperature (Tg) is influenced by the random incorporation of the vinylaromatic compounds in the flexible block of the block copolymer and the use of Lewis bases during the polymerization. A glass transition temperature of from −50 to +25° C., preferably from −50 to +5° C. is typical.

The molecular weight of block A is in general from 1,000 to 200,000, preferably from 3,000 to 80,000, g/mol. Within a molecule, A blocks may have different molecular weights.

The molecular weight of block B/A is usually from 2,000 to 250,000, preferably from 5,000 to 150,000, g/mol.

As in the case of block A, block B/A too may assume different molecular weight values within a molecule.

The coupling center X is formed by the reaction of the living anionic chain ends with a bifunctional or polyfunctional coupling agent. Examples of such compounds are given in U.S. Pat. Nos. 3,985,830, 3,280,084, 3,637,554 and 4,091,053. For example, epoxidized glycerides, such as epoxidized linseed oil or soybean oil, are preferably used; divinylbenzene is also suitable. Dichlorodialkylsilanes, dialdehydes, such as terephthalaldephyde, and esters, such as ethyl formate or ethyl benzoate, are particularly suitable for the dimerization.

Preferable polymer structures are A-B/A—A, X-[B/A—A]$_2$ and Y-[-B/A—A]$_2$, where the random block B/A itself may in turn be divided into blocks B1/A1–B2/A2–B3/A3- . . . The random block preferably consists of from 2 to 15, particularly preferably from 3 to 10, random subblocks. The division of the random block B/A into as many subblocks Bn/An as possible has the decisive advantage that the B/A block as a whole behaves like a virtually perfect random polymer even in the case of a composition gradient within a subblock Bn/An, which is difficult to avoid in the anionic polymerization under practical conditions (see below). It is therefore appropriate to add less than the theoretical amount of Lewis base, which increases the proportion of the 1,4-diene bonds, reduces the glass transition temperature Tg and decreases the susceptibility of the polymer to crosslinking. A larger or smaller amount of subblocks may be provided with a high diene content. As a result of this, the polymer retains a residual toughness even below the glass transition temperature of the predominate B/A blocks and does not become completely brittle.

The block copolymers have a high oxygen permeation P$_o$ and water vapor permeation P$_w$ of more than 2,000 [cm$^3$0.100 $\mu$m/m$^2$·d·bar] and above 10 [g 100 $\mu$m/m$^2$·d·bar], respectively, P$_o$ indicating the amount of oxygen in cm$^3$, and P$_w$ the amount of water vapor in grams, which passes through 1 m$^2$ of film having a standard thickness of 100 $\mu$m per day and per bar partial pressure difference.

The polymerization is carried out in a plurality of stages and, in the case of monofunctional initiation, is begun, for example, with the preparation of the rigid block A. A part of the monomers is initially taken in the reactor and the polymerization is initiated by adding the initiator. In order to achieve a defined chain structure which can be calculated from the monomer and initiator does, it is advisable to continue the process to a high conversion (above 99 percent) before the second monomer addition. However, this is not absolutely essential.

The sequence of the monomer addition depends on the chosen block structure. In the case of monofunctional initiation, for example, the styrene is first either initially taken or directly metered in. Thereafter, butadiene and styrene should be added as far as possible simultaneously. The random structure and the composition of the block B/A are determined by the ratio of butadiene to styrene, the concentration and the chemical structure of the Lewis base and the temperature. According to the invention, the diene accounts for from 50 percent by weight relative to the total material, including styrene. Block A can then be polymerized by adding the styrene. Instead, required polymer blocks may also be bonded to one another by a coupling reaction. In the case of bifunctional initiation, the B/A block is first synthesized, followed by the A block.

The further working up is carried out by the conventional methods. It is advisable to employ a stirred kettle and to protonate the carbanions with an alcohol, such as isopropanol, to render the mixture weakly acidic in the usual manner with $CO_2$/water before the further working up, to stabilize the polymer with an antioxidant and a free radical acceptor (commercial products, such as trisnonylphenyl phosphite (TNPP) or α-tocopherol (vitamin E), or products obtainable under the trade names Irganox 1076 or Irganox 3052, to remove the solvent by the usual methods, and to carry out extrusion and granulation. As in the case of other rubber types, the granules can be prevented from sticking together by means of an antiblocking agent, such as Acrawax®, Besquare® or Acrosil®.

Commercially available forms the above block copolymers may be obtained from BASF AG. For example, a butadiene-styrene block copolymer having the structure S-B/S—S with 26 percent by volume of polystyrene blocks is sold under the designation STYROFLEX®. One particular butadiene-styrene block copolymer is sold under the designation STYROFLEX® BX 6105.

As indicated above, from 1 to 50 parts by weight of the rubber is the elastomeric block copolymer. Preferably, from 15 to 50 parts by weight is the elastomeric block copolymer. Accordingly, from 99 to 50 phr is the first rubber containing olefinic unsaturation. Preferably, from 50 to 85 parts by weight is a rubber (also known herein as the first rubber) which is different from the blade copolymer and contains olefinic unsaturation.

The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include a carboxylated rubber, silicon-coupled and tin-coupled star-branched polymers. The preferred rubber or elastomers are polybutadiene and SBR.

In one aspect the rubber to be combined with the block copolymer is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

When used in the tire tread, the relatively high styrene content of about 30 to about 45 for the E-SBR can be considered beneficial for a purpose of enhancing traction, or skid resistance. The presence of the E-SBR itself is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

A purpose of using S-SBR is for improved tire rolling resistance as a result of lower hysteresis when it is used in a tire tread composition.

The 3,4-polyisoprene rubber (3,4-PI) is considered beneficial for a purpose of enhancing the tire's traction when it is used in a tire tread composition. The 3,4-PI and use thereof is more fully described in U.S. Pat. No. 5,087,668 which is incorporated herein by reference. The Tg refers to the glass transition temperature which can conveniently be determined by a differential scanning calorimeter at a heating rate of 10° C. per minute.

The cis 1,4-polybutadiene rubber (BR) is considered to be beneficial for a purpose of enhancing the tire tread's wear, or treadwear. Such BR can be prepared, for example, by organic solution polymerization of 1,3-butadiene. The BR may be conveniently characterized, for example, by having at least a 90 percent cis 1,4-content.

The term "phr" as used herein, and according to conventional practice, refers to "parts by weight of a respective material per 100 parts by weight of rubber, or elastomer."

In addition to the block copolymer and elastomer in the rubberized component of the tire, conventional fillers may be also present. The amount of such conventional fillers may range from 10 to 250 phr. Preferably, the filler is present in an amount ranging from 20 to 100 phr.

The commonly employed siliceous pigments which may be used in the rubber compound include conventional pyrogenic and precipitated siliceous pigments (silica), although precipitated silicas are preferred. The conventional siliceous pigments preferably employed in this invention are precipitated silicas such as, for example, those obtained by the acidification of a soluble silicate, e.g., sodium silicate.

Such conventional silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The conventional silica may also be typically characterized by having a dibutylphthalate (DBP) absorption value in a range of about 100 to about 400, and more usually about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2 and VN3, etc.

Commonly employed carbon blacks can be used as a conventional filler. Representative examples of such carbon blacks include N110, N121, N220, N231, N234, N242, N293, N299, S315, N326, N330, M332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP No. ranging from 34 to 150 cm³/100 g.

It may be preferred to have the rubber composition for use in the tire component to additionally contain a conventional sulfur containing organosilicon compound. Examples of suitable sulfur containing organosilicon compounds are of the formula:

$$Z\text{-Alk-}S_n\text{-Alk-}Z \quad (15)$$

in which Z is selected from the group consisting of

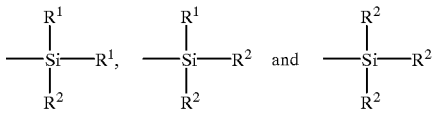

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl)disulfide, 3,3'-bis (triethoxysilylpropyl)disulfide, 3,3'-bis(triethoxysilylpropyl)tetrasulfide, 3,3'-bis(triethoxysilylpropyl)octasulfide, 3,3'-bis(trimethoxysilylpropyl)tetrasulfide, 2,2'-bis(triethoxysilylethyl)tetrasulfide, 3,3'-bis(trimethoxysilylpropyl)trisulfide, 3,3'-bis(triethoxysilylpropyl)trisulfide, 3,3'-bis(tributoxysilylpropyl)disulfide, 3,3'-bis(trimethoxysilylpropyl)hexasulfide, 3,3'-bis(trimethoxysilylpropyl)octasulfide, 3,3'-bis(trioctoxysilylpropyl)tetrasulfide, 3,3'-bis(trihexoxysilylpropyl)disulfide, 3,3-bis(tri-2"-ethylhexoxysilylpropyl)trisulfide, 3,3'-bis(triisooctoxysilylpropyl)tetrasulfide, 3,3'-bis(tri-t-butoxysilylpropyl)disulfide, 2,2'-bis(methoxy diethoxy silyl ethyl)tetrasulfide, 2,2'-bis(tripropoxysilylethyl)pentasulfide, 3,3'-bis(tricyclonexoxysilylpropyl)tetrasulfide, 3,3'-bis(tricyclopentoxysilylpropyl)trisulfide, 2,2'-bis(tri-2"-methylcyclohexoxysilylethyl)tetrasulfide, bis(trimethoxysilylmethyl)tetrasulfide, 3-methoxy ethoxy propoxysilyl 3'-diethoxybutoxy-silylpropyltrasulfide, 2,2'-bis(dimethyl methoxysilylethyl)disulfide, 2,2'-bis(dimethyl sec.butoxysilylethyl)trisulfide, 3,3'-bis(methyl butylethoxysilylpropyl)tetrasulfide, 3,3'-bis(di t-butylmethoxysilylpropyl)tetrasulfide, 2,2'-bis(phenyl methyl methoxysilylethyl)trisulfide, 3,3'-bis(diphenyl isopropoxysilylpropyl)tetrasulfide, 3,3'-bis(diphenyl cyclohexoxysilylpropyl)disulfide, 3,3'-bis(dimethyl ethylmercaptosilylpropyl)tetrasulfide, 2,2'-bis(methyl dimethoxysilylethyl)trisulfide, 2,2'-bis(methyl ethoxypropoxysilylethyl)tetrasulfide, 3,3'-bis(diethyl methoxysilylpropyl)tetrasulfide, 3,3'-bis(ethyl di-sec. butoxysilylpropyl)disulfide, 3,3'-bis(propyl diethoxysilylpropyl)disulfide, 3,3'-bis(butyl dimethoxysilylpropyl)trisulfide, 3,3'-bis(phenyl dimethoxysilylpropyl)tetrasulfide, 3-phenyl ethoxybutoxysilyl 3'-trimethoxysilylpropyl tetrasulfide, 4,4'-bis(trimethoxysilylbutyl)tetrasulfide, 6,6'-bis(triethoxysilylhexyl)tetrasulfide, 12,12'-bis(triisopropoxysilyl dodecyl)disulfide, 18,18'-bis(trimethoxysilyloctadecyl)tetrasulfide, 18,18'-bis(tripropoxysilyloctadecenyl)tetrasulfide, 4,4'-bis(trimethoxysilyl-buten-2-yl)tetrasulfide, 4,4'-bis(trimethoxysilylcyclohexylene)tetrasulfide, 5,5'-bis(dimethoxymethylsilylpentyl)trisulfide, 3,3'-bis(trimethoxysilyl-2-methylpropyl)tetrasulfide, 3,3'-bis(dimethoxyphenylsilyl-2-methylpropyl)disulfide.

The preferred sulfur containing organosilicon compounds are the 3,3'-bis(trimethoxy or triethoxy silylpropyl)sulfides. The most preferred compounds are 3,3'-bis(triethoxysilylpropyl)disulfide and 3,3'-bis(triethoxysilylpropyl)tetrasulfide. Therefore as to formula 15, preferably Z is

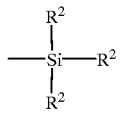

where $R^2$ is an alkoxy of 2 to 4 carbon atoms, with 2 carbon atoms being particularly preferred; alk is a divalent hydrocarbon of 2 to 4 carbon atoms with 3 carbon atoms being particularly preferred; and n is an integer of from 2 to 5 with 2 and 4 being particularly preferred.

The amount of the sulfur containing organosilicon compound of formula 15 in a rubber composition will vary depending on the level of other additives that are used. Generally speaking, the amount of the compound of formula 15 will range from 0.5 to 20 phr. Preferably, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Preferably, the sulfur vulcanizing agent is elemental sulfur. The sulfur vulcanizing agent may be used in an amount ranging from 0.5 to 8 phr, with a range of from 1.5 to 6 phr being preferred. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, naphthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, preferably about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can be accomplished by methods known to those having skill in the rubber mixing art. For example the ingredients are typically mixed in at least two stages, namely at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage (s). The rubber and block copolymer are mixed in one or more non-productive mix stages. The terms "non-productive" and "productive" mix stages are well known to those having skill in the rubber mixing art. The block copolymer may be added as a separate ingredient or in the form of a masterbatch. The rubber composition containing the block copolymer, as well as the sulfur-containing organosilicon compound, if used, may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes.

One feature of the many block copolymers is their solubility in organic solvents. This feature offers the opportunity to incorporate such block copolymers into the first rubber elastomers via a number of ways aside from mechanical working in a mixer or extruder. For example, it is contemplated that one can disperse or dissolve the block copolymer in a polymer cement (elastomer solubilized in an organic solvent) with mixing and removal of the solvent to yield a uniformly dispersed block copolymer in the elastomer. In accordance with another embodiment, one can solubilize the block copolymer in the organic solvent along with the monomer or monomers for subsequent solution polymerization. Under this embodiment, the monomers polymerize to form the elastomer in the block copolymer media.

The rubber composition containing the rubber and block copolymer may be incorporated in a variety of rubber components of the tire. For example, the rubber component may be a tread (including tread cap and tread base), sidewall, apex, chafer, sidewall insert, wirecoat and ply coat. Preferably, the compound is the tread including a tread cap and/or tread base.

The pneumatic tire of the present invention may be a passenger tire, aircraft tire, agricultural, earthmover, off-the-road, truck tire and the like. Preferably, the tire is a passenger or truck tire. The tire may also be a radial or bias, with a radial being preferred.

Vulcanization of the pneumatic tire of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air.

Upon vulcanization of the sulfur vulcanized composition, the rubber composition of this invention can be used for various purposes. For example, the sulfur vulcanized rubber composition may be in the form of a tire, belt or hose. In case of a tire, it can be used for various tire components. Such tires can be built, shaped, molded and cured by various methods which are known and will be readily apparent to those having skill in such art. Preferably, the rubber composition is used in a sidewall and/or the tread of a tire. As can be appreciated, the tire may be a passenger tire, aircraft tire, truck tire and the like. Preferably, the tire is a passenger tire. The tire may also be a radial or bias, with a radial tire being preferred.

EXAMPLE

In this example, a commercially available block styrene butadiene copolymer was evaluated in place of an emulsion SBR ingredient in a model tread compound for a tire. The block styrene butadiene copolymer was Styroflex® BX 6105.

Rubber compositions containing the materials set out in Table I and II were prepared in a BR Banbury™ mixer using two separate stages of addition (mixing); namely, one non-productive mix stage and one productive mix stage.

The rubber compositions are identified as Samples 1 through 4. Samples 1 and 3 are considered herein as being controls without the use of the specific block styrene butadiene copolymer.

The samples were cured for 14 minutes at 160° C.

Table II illustrates the behavior and physical properties of the cured Samples 1 through 4.

TABLE 1

|  | Control Sample 1 | Sample 2 | Control Sample 3 | Sample 4 |
|---|---|---|---|---|
| Non-Productive |  |  |  |  |
| E-SBR[1] | 50 | 25 | 50 | 25 |
| Solution SBR[2] | 68.75 | 68.75 | 68.75 | 68.75 |
| Styroflex ® BX 6105 | 0 | 25 | 0 | 25 |
| Wax | 3 | 3 | 3 | 3 |
| Processing oil | 6 | 6 | 6 | 6 |
| Antidegradants | 3 | 3 | 3 | 3 |
| Resin | 1 | 1 | 1 | 1 |
| Fatty acid | 2 | 2 | 2 | 2 |
| Zinc oxide | 4 | 4 | 4 | 4 |
| Carbon black | 65 | 65 | 65 | 65 |
| Productive |  |  |  |  |
| Sulfenamide and guanidine accelerators | 1.66 | 1.66 | 1.56 | 1.56 |
| Antidegradant | 1 | 1 | 1 | 1 |
| Sulfur | 1.8 | 1.8 | 1.5 | 1.5 |

[1]1502 type
[2]Oil extruded 1712 type

TABLE 2

|  | Control Sample 1 | Sample 2 | Control Sample 3 | Sample 4 |
|---|---|---|---|---|
| E-SBR | 50 | 25 | 50 | 25 |
| Styroflex ® BX 6105 | 0 | 25 | 0 | 25 |
| 100% Modulus (MPa) | 1.588 | 2.093 | 1.369 | 2.236 |
| 300% Modulus (MPa) | 7.610 | 7.462 | 6.038 | 7.850 |
| Rebound (%) | 33.2 | 24.2 | 32.8 | 21.4 |
| Shore A (RT) | 62.219 | 71.319 | 60.416 | 74.516 |
| Tensile Strength | 18.449 | 17.072 | 17.417 | 16.463 |

As can be seen from the above data, one can predict that use of Samples 2 and 4 (present invention) in a tread compound of a tire versus Samples 1 and 3 (Controls) would provide better dry handling due to increased stiffness (higher Shore A and 100% Modulus) and improved wet traction (reduced rebound values).

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having a rubber component comprising a sulfur cured rubber composition composed of, based on 100 parts by weight of rubber (phr):
    (a) 99 to 50 parts by weight of a first rubber containing olefinic unsaturation; and
    (b) 1 to 50 parts by weight of a second rubber which is different from said first rubber and which is an elastomeric block copolymer of
        (1) from 15 to 65 percent by weight, based on the total block copolymer, of butadiene, and
        (2) from 35 to 85 percent by weight, based on the total block copolymer, of styrene, which block copolymer has:
            (a) at least two blocks A which have polymerized units of styrene, a glass transition temperature Tg above 50° C. and forms a rigid phase, and
            (b) at least one elastomeric block which is composed of about 25 to 70 percent by weight of butadiene and 75 to 30 percent by weight of styrene, and which has polymerized B/A units of styrene and butadiene in a random structure; a glass transition temperature Tg from −50° C. to 25° C., and is located between two blocks A and forms a flexible phase, and the amount of the rigid phase accounts for 5 to 40 percent by volume.

2. The pneumatic tire of claim 1 wherein said blocks copolymer is obtained by anionic polymerization, and at least the polymerization of the flexible phase has been carried out in the presence of a polar cosolvent.

3. The pneumatic tire of claim 1 wherein said blocks copolymer comprises a plurality of blocks B/A having different molecular weights per individual block B/A.

4. The pneumatic tire of claim 1 wherein said blocks copolymer comprises a plurality of blocks A having different molecular weights per molecule.

5. The pneumatic tire of claim 1 wherein said block copolymer is represented by one or more of the formulae (1) to (11)

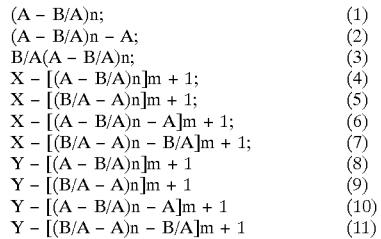

where X is the radical of an (m+1)-functional initiator, Y is the radical of an (m+1)-functional initiator, Y is the radical of an (m+1)-functional coupling agent and m is a natural number from 1 to 10; n at formulas (1), (3), (4) and (8) is a natural number from 2 to 10; n at formulas (2), (5) through (7), and (9) through (11) is a natural number from 1 to 10.

6. The pneumatic tire of claim 5 wherein said block copolymer is represented by the formula A-B/A—A, X-[B/A—A]$_2$ or Y-[B/A—A]$_2$.

7. The pneumatic tire of claim 1 wherein the flexible phase B/A is divided into blocks

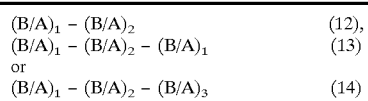

the indices 1, 2, 3 indicating that the styrene/butadiene ratio in the individual blocks B/A is different or that the individual blocks B/A have different molecular weights, the glass transition temperature T of each art-block being below 25° C.

8. The pneumatic tire of claim 1 wherein said rubber is selected from the group consisting of natural rubber, neoprene, polyisoprene, butyl rubber, halobutyl rubber, polybutadiene, styrene-butadiene copolymer, styrene/isoprene/butadiene rubber, methyl methacrylate-butadiene copolymer, isoprene-styrene copolymer, methyl methacrylate-isoprene copolymer, acrylonitrile-isoprene copolymer, acrylonitrile-butadiene copolymer, carboxylated rubber, EPDM, silicon-coupled star-branched polymers, tin-coupled star-branched polymers and mixtures thereof.

9. A pneumatic tire having a rubber component comprising a sulfur cured rubber composition composed of, based on 100 parts by weight of rubber (phr):
(a) 99 to 50 parts by weight of a first rubber containing olefinic unsaturation; and
(b) 1 to 50 parts by weight of a second rubber which is different from said first rubber and which is an elastomeric block copolymer of
(1) from 15 to 65 percent by weight, based on the total block copolymer, of butadiene, and
(2) from 35 to 85 percent by weight, based on the total block copolymer, of styrene, which block copolymer has:
  (a) at least two blocks A which have polymerized units of styrene, a glass transition temperature Tg above 25° C. and forms a rigid phase, and
  (b) at least one elastomeric block which is composed of about 25 to 70 percent by weight of butadiene and 75 to 30 percent by weight of styrene, and which has polymerized B/A units of styrene and butadiene in a random structure; a glass transition temperature Tg from −50° C. to 25° C., and is located between two blocks A and forms a flexible phase, and the amount of the rigid phase accounts for 5 to 40 percent by volume;
said rubber composition further comprising from 0.5 to 20 phr of a sulfur containing organosilicon compound of the formula:

Z-Alk-$S_n$-Alk-Z    (15)

in which Z is selected from the group consisting of

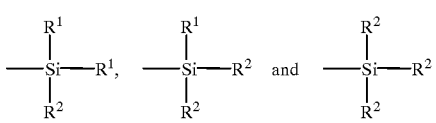

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

10. The pneumatic tire of claim 1 wherein said composition is thermomechanically mixed at a rubber temperature in a range of from 140° C. to 190° C. for a total mixing time of from 1 to 20 minutes.

11. The pneumatic tire of claim 1 wherein said tire is selected from the group consisting of passenger tires, aircraft tires, agricultural, earthmover, off-the-road and truck tires.

12. The pneumatic tire of claim 1 where said tire is a radial.

13. A pneumatic tire of claim 1 wherein said rubber component is selected from the group consisting of a tread cap, tread base, sidewall, apex, chafer, sidewall insert, wirecoat and ply coat.

14. The pneumatic tire of claim 1, said elastomeric block copolymer having
(1) from 25 to 60 percent by weight, based on the total block copolymer, of butadiene, and
(2) from 40 to 75 percent by weight, based on the total block copolymer, of styrene.

15. The pneumatic tire of claim 9 wherein the Tg of the rigid phase of said block copolymer is above 50° C.

16. The pneumatic tire of claim 9 wherein said block copolymer is represented by one or more of the formulae (1) to (11)

| | |
|---|---|
| (A − B/A)n; | (1) |
| (A − B/A)n − A; | (2) |
| B/A(A − B/A)n; | (3) |
| X − [(A − B/A)n]m + 1; | (4) |
| X − [(B/A − A)n]m + 1; | (5) |
| X − [(A − B/A)n − A]m + 1; | (6) |
| X − [(B/A − A)n − B/A]m + 1; | (7) |
| Y − [(A − B/A)n]m + 1 | (8) |
| Y − [(B/A − A)n]m + 1 | (9) |
| Y − [(A − B/A)n − A]m + 1 | (10) |
| Y − [(B/A − A)n − B/A]m + 1 | (11) | where X is the radical of an (m+1)-functional initiator, Y is the radical of an (m+1)-functional initiator, Y is the radical of an (m+1)-functional coupling agent and m is a natural number from 1 to 10; n at formulas (1), (3), (4) and (8) is a natural number from 2 to 10; n at formulas (2), (5) through (7), and (9) through (11) is a natural number from 1 to 10.

17. The pneumatic tire of claim 16, wherein said block copolymer is represented by the formula A-B/A—A, X-[B/A—A]$_2$ or Y-[B/A—A]$_2$.

18. The pneumatic tire of claim 9 wherein the flexible phase B/A is divided into blocks

| | |
|---|---|
| (B/A)$_1$ − (B/A)$_2$ | (12), |
| (B/A)$_1$ − (B/A)$_2$ − (B/A)$_1$ | (13) |
| or | |
| (B/A)$_1$ − (B/A)$_2$ − (B/A)$_3$ | (14) | the indices 1, 2, 3 indicating that the styrene/butadiene ratio in the individual blocks B/A is different or that the individual blocks B/A have different molecular weights, the glass transition temperature Tg of each part-block being below 25° C.

19. The pneumatic tire of claim 9 wherein said rubber is selected from the group consisting of natural rubber, neoprene, polyisoprene, butyl rubber, halobutyl rubber, polybutadiene, styrene-butadiene copolymer, styrene/isoprene/butadiene rubber, methyl methacrylate-butadiene copolymer, isoprene-styrene copolymer, methyl methacrylate-isoprene copolymer, acrylonitrile-isoprene copolymer, acrylonitrile-butadiene copolymer, carboxylated rubber, EPDM, silicon-coupled star-branched polymers, tin-coupled star-branched polymers and mixtures thereof.

20. The pneumatic tire of claim 9 wherein said rubber component is selected from the group consisting of a tread cap, tread base, sidewall, apex, chafer, sidewall insert, wirecoat and ply coat.

* * * * *